United States Patent [19]

Yatsuzuka

[11] 4,303,803
[45] Dec. 1, 1981

[54] DIGITAL SPEECH INTERPOLATION SYSTEM

[75] Inventor: Yohtaro Yatsuzuka, Yokohama, Japan

[73] Assignee: Kokusai Denshin Denwa Co., Ltd., Tokyo, Japan

[21] Appl. No.: 71,255

[22] Filed: Aug. 30, 1979

[30] Foreign Application Priority Data

Aug. 31, 1978 [JP] Japan ................................ 53-105611
Sep. 4, 1978 [JP] Japan ................................ 53-108346

[51] Int. Cl.³ .............................................. H04J 6/02
[52] U.S. Cl. ...................... 177/15.55 R; 179/15.55 T
[58] Field of Search ...................... 179/15.55 R, 1 SC;
370/80, 81, 83; 332/11 D; 358/260, 261;
340/347 DD; 375/27, 28

[56] References Cited

U.S. PATENT DOCUMENTS 3,431,356  3/1969  Copel ................................ 179/1 SH
4,064,363  12/1977 Malm ................................ 179/1 SA
4,142,071  2/1979  Croisier et al. .............. 179/15.55 R
4,149,039  4/1979  Yuguchi et al. .............. 179/15.55 R
4,167,653  9/1979  Araseki et al. .................. 179/1 SC Primary Examiner—Mark E. Nusbaum
Assistant Examiner—E. S. Kemeny

[57] ABSTRACT

A digital speech interpolation system is combined with an adaptive differential PCM (ADPCM), employing a speech detector for detecting speech signals and for discriminating voiced and unvoiced sounds. An adaptive quantization bit assignment to the speech is adopted to cope with any freeze-out condition. And further PCM speech signals with 8 KHz sampling are applied to ADPCM after shifted 250 Hz down and then converted into 6 KHz sampling frequency, thereby attaining a total gain of about 7 without degrading speech quality.

2 Claims, 6 Drawing Figures

DIGITAL SPEECH INTERPOLATION SYSTEM

BACKGROUND OF THE INVENTION

This invention relates to a digital speech interpolation system, and particularly to an efficient digital speech interpolation system in which as many digitized speech signals as possible are transmitted through a transmission line having a limited communication capacity while avoiding freeze-out and assuring a practically satisfactory quality of speech. The term "freeze-out" as used throughout the specification and claims is intended to describe the condition in which the inputs to the digital speech interpolation system overflow the output capacity of such system. This invention is useful particularly for a long distance telephone system such as international telephone lines, because it can widely improve the efficiency of utilization of a transmission line in a digital satellite communication system or a digital undersea cable system.

Owing to highly developed digital signal processing techniques, in telephony a digital speech transmission system is practically used in which speech signals are digitized to be transmitted. For the purpose of economization by efficiently utilizing a transmission line having a limited communication capacity, a digital speech interpolation system called DSI system is employed in this digital speech transmission system. Moreover, a predictive coding system which makes coding with a short bit length is used together with the DSI system. In case of transmitting a plurality of digital speech signal, the DSI system transmits, by detecting sound portions of speech signals in each input trunk, and by combining only said detected sound portion to form new digital signals, the new digital signals through a smaller number of output channels than the number of the input trunks. Generally, digital speech signals are divided into unit blocks which are a ground of a predetermined number of serial samples. For each unit block, a speech detector detects whether or not speech exists in the unit block. The unit blocks in which speech exists are transmitted. On the other hand, in the predictive coding system a predictor predicts a present sample value from past group of sample values of input digital signal. The difference between the predicted value and the actual sample value, i.e., prediction error is calculated with a subtracter. A quantizer performs quantization of prediction error. By abovementioned manner information can be transmitted at a low bit rate. Such typical systems include a delta modulation system which performs coding with one bit and a differential PCM (DPCM) system which performs coding with two or more bits. Among DPCM systems there is an adaptive DPCM (ADPCM) system in which the quantization level interval of the quantizer and the prediction coefficient of the predictor are controlled so as to be of an optimum value at any times.

An efficient DSI system in which a DSI system is combined with a DPCM system or an ADPCM system has been proposed. In the efficient DSI system a very high degree of utilization of transmission line is made possible owing to the effective utilization of transmission line which is inherent in the DSI system transmitting only the speech portions, and owing to the band compression in the predictive coding system transmitting the speech portions at a low bit rate. Namely, by defining a DSI gain as the ratio of the number of DSI input trunks to the number of DSI output channels which ratio is determined by the proportion of the detected and transmitted speech portions to the whole of input signal on the trunk, and by defining a predictive coding gain as a reciprocal of the reduction factor of the number of bits after predictive coding to the number of original coding bits of speech signal, the total gain of the efficient DSI system may be expressed as the product of the DSI gain and the predictive coding gain.

Although in theory a DSI gain of about 2.5 should be obtained because the average operating percentage of speech is generally said to be about 40%, in practice the DSI gain is set to about 2 for safety design to avoid frequent occurrence of freeze-out. If the DSI gain is set to near 2.5, the number of active input trunks of DSI input trunks in which speech is existing would tend to instantaneously exceed the number of DSI output channels, whereby some of the active input trunks could not be connected to an output channel. This would lead to frequent occurrence of freeze-out in which speech is not transmitted. On the other hand, in the predictive coding system, predictive coding with a fixed length of 4 bits is adopted to keep the quality of speech expressed by signal-to quantization noise ratio $S/N_q$ at substantially the same degree as normal 8 to 6 bit PCM. Only a predictive coding gain of at most 2 can be obtained. In this case, the predictive coding maintains redundancy, because 4 bit length coding necessary to low $S/N_q$ speech portions is similarly applied to high $S/N_q$ speech portions.

On the other hand, low speed sampling is useful to effectively utilize a transmitting line. Really, digitization with 6 KHz sampling has been adopted. A 8 KHz sampling is normally adopted for digital speech signal in telephony. This is based on the fact that analog speech signals in telephony are standardized within a transmission frequency band ranging from 0.3 to 3.4 KHz. But, in a speech transmitting system adopting FDM (Frequency Division Multiplex) undersea cable transmitting system, transmission with 3 KHz band has been practically used, so the 6 KHz sampling has been adopted accordingly. More specifically, after speech signals transmitted with 8 KHz-8bit PCM are once converted to 8 KHz-13 bit linear PCM, they are passed through a low pass filter of 3 KHz band and sampling speed is converted to 6 KHz. And the speech signals are predictively coded by a 4 bit quantizing and 6 KHz sampling ADPCM encoder and transmitted to digital undersea cable or digital satellite communication system at 24 kb/s. However, in the speech transmission system with 6 KHz sampling the transmitted frequency band is 0.3 to 3.0 KHz. Therefore, the system has the disadvantage that the high frequency components of 3.0 to 3.4 KHz of the speech signals standardized within the band of 0.3 to 3.4 KHz are cut off, thereby degrading the quality of reproduced speech in its high frequency region.

SUMMARY OF THE INVENTION

An object of this invention is to provide an efficient digital speech interpolation system wherein avoidance of freeze-out and improvement in the DSI gain are attained. Another object of this invention is to provide said efficient digital speech interpolation system wherein sampling speed is lowered without adversely influencing the transmission frequency band.

According to an aspect of this invention, in a digital speech interpolation system wherein digital input signals are divided into unit blocks which are a group of a predetermined number of serial samples and only the unit blocks in which speech is existing are transmitted after predictively coded, the predictive coding is carried out with a variable quantizing bit type predictive encoder, and it is determined whether or not signal-to-quantization noise ratio of the speech in the unit blocks in which speech is existing is good. If freeze-out occurs in speech interpolation, the number of bits in predictive coding is reduced in the order of the unit blocks having a better signal-to-quantization noise ratio. Preferably, after the frequency is shifted down to a lower one to the extent that a considerable degradation of speech does not occur and then the sampling speed of the digital input signals is converted to a lower one, predictive coding is performed.

As described above, according to this invention, a predictive encoder with a variable bit quantization is employed so that the number of bits in predictive coding may be reduced for unit blocks having a good signal-to quantization noise ratio when freeze-out occurs. Therefore, the unit blocks which would otherwise come under a freeze-out condition can be free from freeze-out because of predictive coding with surplus bits by said reduction. Furthermore, the unit blocks wherein the number of bits has been reduced suffer from no significant degradation of the quality of speech because of their good signal-to-quantization noise ratio. For this reason, according to this invention, a high DSI gain can be set and an efficient utilization of transmission line can be achieved. And, according to this invention, since the frequency is shifted down to a lower one with the original sampling speed being kept before the conversion of the sampling speed into a lower speed, an effective utilization of transmission line due to the lowering of the sampling speed can be achieved without any considerable degradation of the high frequency components of speech.

DETAILED DESCRIPTION OF PREFERRED EMBODIMENTS

Embodiments of this invention will be described in connection with the accompanying drawings. In the embodiments, it is assumed that 8 bit PCM signals with 8 KHz sampling are input and unit blocks each formed by 32 samples thereof are output to DSI output channels after speed conversion to 6 KHz sampling.

Figure 1:
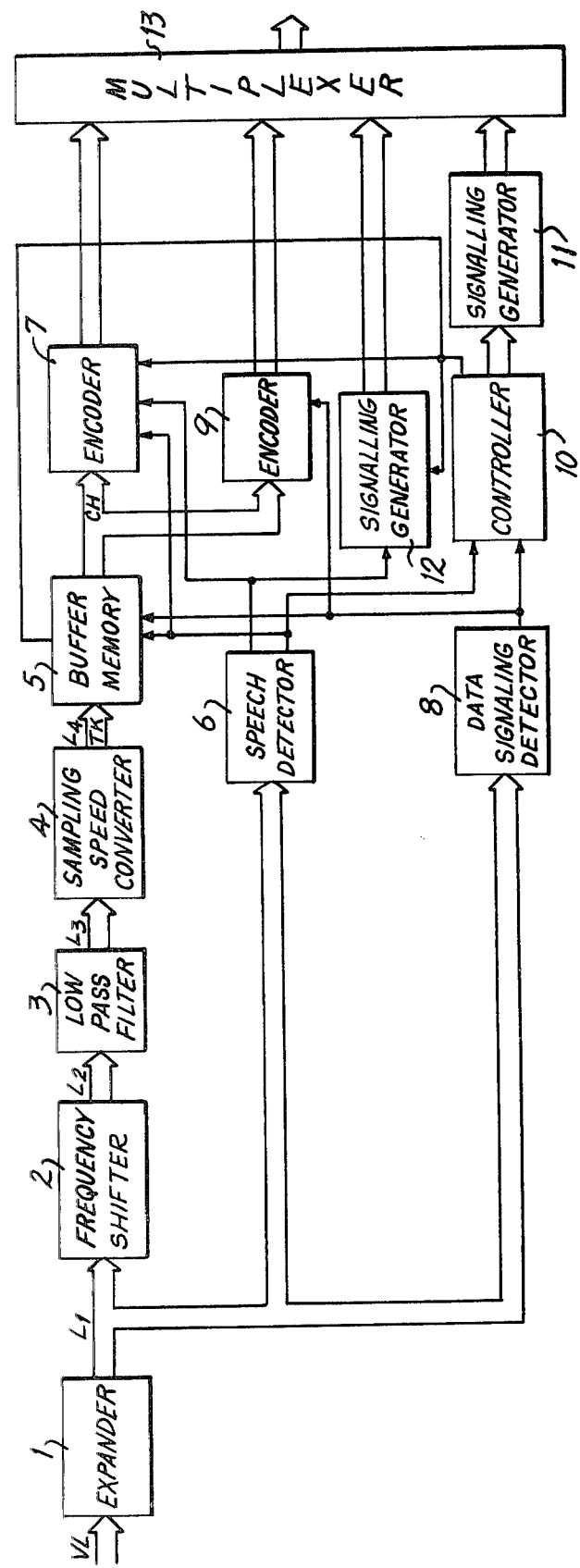
FIG. 1 is a block diagram showing an embodiment of this invention.
Figure 2:
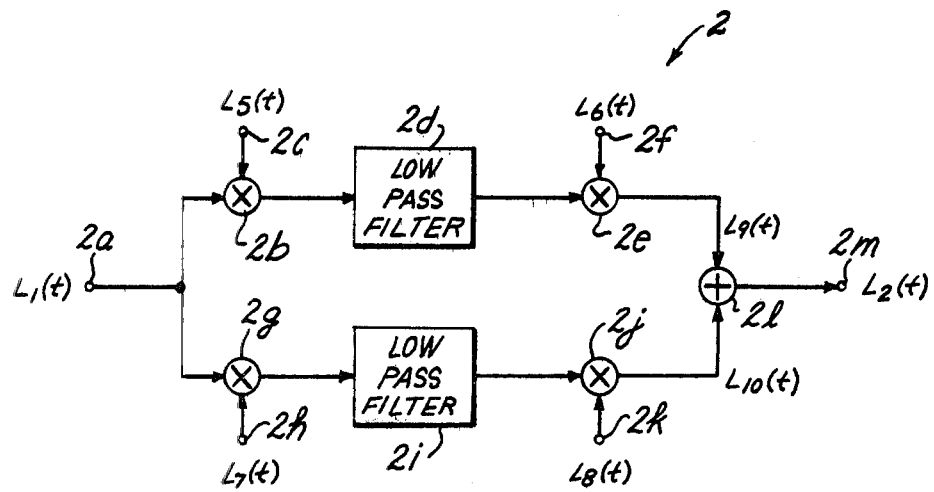
FIG. 2 is a block diagram showing the structure of a frequency shifting circuit.

The embodiment of this invention shown in FIG. 1 comprises an expander 1, a frequency converter 2, a 3 KHz digital low pass filter 3, a sampling speed converter 4, a buffer memory 5, a speech detector 6, a variable quantizing bit type ADPCM encoder 7 for speech, a data signaling detector 8, an ADPCM encoder 9 for data, an assignment controller 10, an assignment status signal generator 11, a bit length indicating signal generator 12 and a multiplexer 13. A nonlinear PCM signal NL of 8 bits with 8 KHz sampling input is converted into a linear PCM signal $L_1$ of 13 bits with 8 KHz sampling by the expander 1. The voice band frequency components of 0.3 to 3.4 KHz of the linear PCM signal $L_1$ is shifted 200 Hz down to lower range by the frequency converter 2 so as to be of 0.1 to 3.2 KHz. The linear PCM signal $L_2$ including the frequency components of 0.1 to 3.2 KHz is converted through the digital filter 3 to a linear PCM signal $L_3$ having frequency components of 0.1 to 3.0 KHz which is in turn speed converted into a linear PCM signal $L_4$ with 6 KHz sampling by a sampling speed converter 4. In this case, the frequency components of the linear PCM signal $L_4$ are only cut off by 0.2 KHz in higher range compared with the linear PCM signal $L_1$ with 8 KHz sampling. If the linear PCM signal $L_4$ is again shifted 200 Hz up to higher range after speed conversion to 8 KHz sampling, a linear PCM signal having frequency components of 0.3 to 3.2 KHz is obtained. The linear PCM signal $L_4$ with 6 KHz sampling is stored in the buffer memory 5 every 24 samples. These 24 samples correspond to unit blocks of 32 samples in the linear PCM signal $L_1$ with 8 KHz sampling. FIG. 2 shows an example of the frequency converter 2. This converter 2 comprises four multipliers $2b$, $2e$, $2g$ and $2j$, two low pass filters $2d$ and $2i$, and an adder $2l$. Signals $L_5$, $L_6$, $L_7$ and $L_8$ are supplied to the input terminals $2c$, $2f$, $2h$ and $2k$ of the multipliers $2b$, $2e$, $2g$ and $2j$ respectively. These signals $L_5$, $L_6$, $L_7$ and $L_8$ in this example are linear PCM signals with 8 KHz sampling which may be expressed by the following equation (1). The low pass filters $2d$ and $2i$ have a band of 2 KHz.

$$L_5(t) = \cos W_o t \qquad (1)$$
$$L_6(t) = 2 \cos W_x t$$
$$L_7(t) = \sin W_o t$$
$$L_8(t) = 2 \sin W_x t$$

where
 $fo = Wo/2\pi = 2$ KHz,
 $fx = Wx/2\pi = fo - \Delta fo$, and
 $\Delta fo$ is a shift value.

The signal $L_1$ supplied to the input terminal $2a$ is multiplied by the signal $L_5$ with the multiplier $2b$ and passed through the low pass filter $2d$, and further multiplied by the signal $L_6$ with the multiplier $2e$, thereby providing a signal $L_9$. Similarly, the signal $_1$ is multiplied by the signal $L_7$ with the multiplier $2g$ and passed through the low pass filter $2i$, and further multiplied by the signal $L_8$ with the multiplier $2j$, thereby providing a signal $L_{10}$. The signals $L_9$ and $L_{10}$ are summed with the adder $2l$, thereby providing a signal $L_2$ at the output terminal $2m$ which is shifted 200 Hz down. Incidentally, if $fx = fo + \Delta fo$ it goes without saying that a signal shifted $\Delta fo$ up can be obtained. The $\Delta fo$ may be selected up to 300 Hz.

Figure 3:
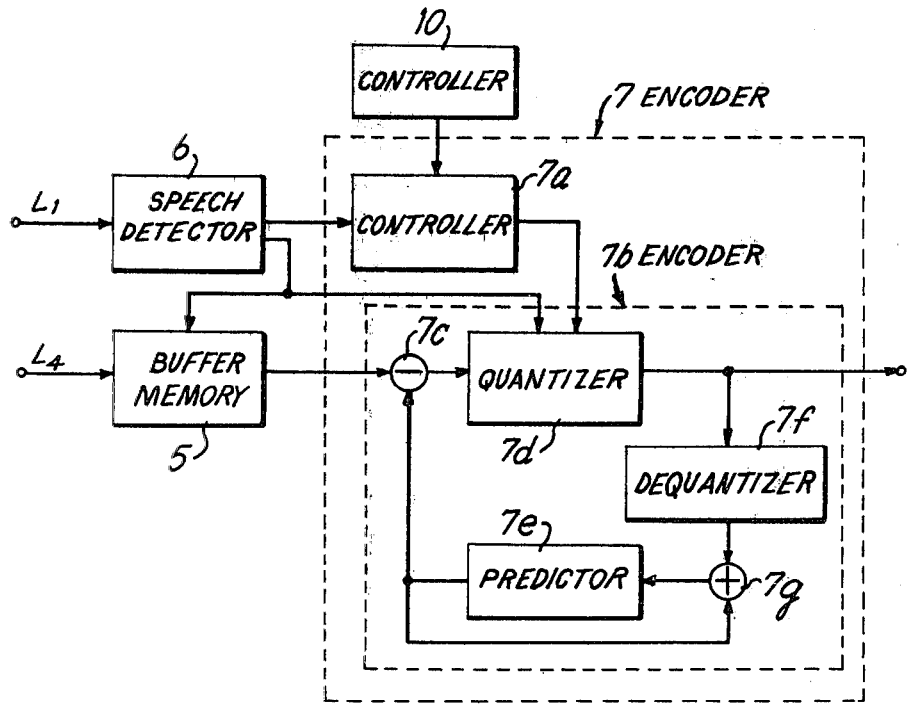
FIG. 3 is a block diagram showing the structure of a variable quantizing bit length predictive coding circuit.

While the linear PCM signal $L_4$ with 6 KHz sampling including speech band signals of 0.1 to 3.0 KHz shifted down is stored in the buffer memory 5, the data and signaling thereof are separated from the input signal and encoded wth the ADPCM encoder 9 and transmitted, and only the speech portion is sent through the DSI channel CH. The speech portion and data of the linear PCM signal $L_4$ may be processed by the same ADPCM encoder without being separated from each other. FIG. 3 shows a portion of FIG. 1 concerned with speech.

The variable quantizing bit type ADPCM encoder 7 comprises a bit length controller 7a and an ADPCM encoder 7b. The ADPCM encoder 7b consists of a subtractor 7c, an adaptive quantizer 7d, and adaptive predictor 7e, a dequantizer 7f and an adder 7g. Although the block diagram of FIG. 3 shows an independent system, referring to FIG. 1, it can be seen that the buffer memory 5 and the speech detector 6 may be commonly used for each input trunk TK and that the same number of the variable quantizing bit type ADPCM encoders 7 as the number of DSI output channels CH are provided.

The linear PCM signal $L_1$ with 8 KHz sampling is detected by the speech detector 6 every unit block of 32 samples as to whether or not speech is existing in the unit block. Moreover, to the unit blocks existing speech it is predicted whether or not the signal-to-quantization noise ratio $S/N_q$ of the speech is good. To the unit block of 32 samples in which the speech detector 6 has detected that speech is existing, a unit block of 24 samples of the linear PCM signals $L_4$ with 6 KHz sampling corresponding to this unit block 32 samples is read out from the buffer memory 5. The unit block read out is applied to the ADPCM encoder 7b of the variable quantizing bit type ADPCM encoder 7. The assignment controller 10 controls which variable quantizing bit type ADPCM encoder 7 be assigned, which belongs to channel CH. Simultaneously, the $S/N_q$ good or not information of the read out unit block is sent to the bit length controller 7a of the assigned variable quantizing bit type ADPCM encoder 7 from the speech detector 6. If freeze-out occurs, the bit length controller 7a sends to the quantizer 7d instructions as to the designation of the unit block in which the predictive coding bit length should be reduced, and as to the bit length to be reduced. In this case, the unit blocks in which the bit length should be reduced are designated in the order of the unit blocks having better $S/N_q$. For example, predictive coding with normal 4 bit length is made with 3 bit length to the good $S/N_q$ unit block. Information as to the bit lengths of each unit block is produced by the coding bit length indicating signal generator 12. Assignment status signals representing the corresponding relationships between the input trunks TK and out put channels CH are produced by the assignment status signal generator 11, according to controlling signals from the assignment controller 10.

Figure 4:
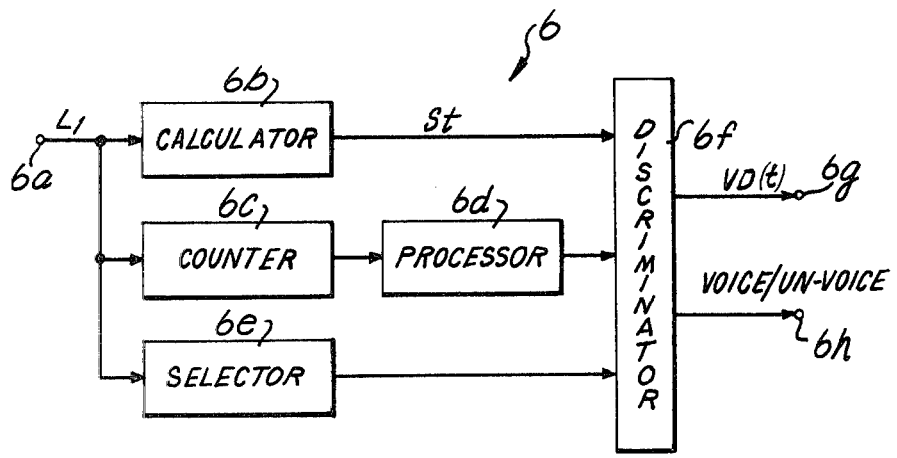
FIG. 4 is a block diagram showing the structure of a circuit for determining whether or not the signal-to quantization noise ratio of speech is good.

The speech detector 6 comprises a speech detecting part for detecting whether or not speech is existing in the unit block by utilizing an internal power in the unit block or the number of zero crossings in the unit block, and a speech nature judging part for determining the nature of speech in the unit block, that is, whether or not the signal-to-quantization noise ratio $S/N_q$ is good. Regarding the signal-to-quantization noise ratio $S/N_q$ of speech, generally, the speech including many lower frequency components (i.e. voiced sound) has a good $S/N_q$, while the speech including many higher frequency components or having flat spectrum (i.e. unvoiced sound) has a poor $S/N_q$. In other words, while most of speeches such as vowel sounds are voices and thus have a good $S/N_q$, un-voices such as fricative consonant and a plosive have a poor $S/N_q$. The speech nature judging part of the speech detector 6 may be of the type wherein if it is detected that a unit block has extraordinary a number of zero crossings it is judged the $S/N_q$ of the unit block is not good, or of the type wherein a predictor set to lower frequency range is used and if it is detected that in a unit block many wrong predictions occur, it is judged the $S/N_q$ of the unit block is poor. In this embodiment a speech detector having the structure of circuit as shown in FIG. 4 is used. In FIG. 4, the speech detector 6 comprises a power calculator 6b, a zero crossing rate counter 6c, a threshold selector 6d, a polarity bit matrix processor 6e and a discriminator 6f. For the signal $L_1$ of 8 KHz·13 bit applied to the input terminal 6a, the power calculator 6b is for calculating the internal power St every unit block $\tau$ of 32 samples. The internal power St is compared with a reference value of $S_{Th}$ by the discriminator 6f. When $St < S_{Th}$, it is judged that the unit block $\tau$ is silence. On the other hand, when $S_{Th} \leq St$, it is judged that the unit block $\tau$ includes speech, and then a speech detecting signal VD(t) is produced from the output terminal 6g. The judgement, as to whether or not the $S/N_q$ of the unit block $\tau$ producing the speech detecting signal VD(t) is good, is made as follows:

Taking notice of a main series which is a series of the polarities of the respective sample values in the unit block $\tau$ itself and a sub-polarity series which is a series of the polarities of the respective sample values in the unit block $\tau$ passed through the digital filter, whether it is voice or unvoice is judged on the basis of the periodicity of the inversion of the polarity and voice-unvoice display signal is produced at the output terminal 6h. For this purpose, the similarity of the main series and the sub-polarity series to a reference polarity series of sampled sine and cosine waves with a fundamental and its harmonic frequency component is calculated by the polarity bit matrix processor 6e. The reference polarity series is a polarity bit sequence matrix consisting of elements of $\pm 1$ expressed by the following equations (2) and (3):

$$Hl = (Hij) \qquad (2)$$

$$Hij = \begin{cases} \text{Sign}\left[\sin \dfrac{\pi \cdot \Delta f \cdot (i+1)(2j-33)}{16000}\right] & ; i = \text{odd number.} \\ \text{Sign}\left[\cos \cdot \dfrac{\pi \cdot \Delta f \cdot i \cdot (2j-33)}{16000}\right] & ; i = \text{even number} \end{cases} \qquad (3)$$

where
$j = 1 \sim m = 1 \sim 32$,
$i = n_1 \sim n_2$,
$\Delta f = 125$ Hz,
$m = $ unit block length.

On the other hand, the main and sub-polarity series may be expressed as $Z^l(t)$ if the characteristics of the digital filter are specified by $l (= 1 \sim 5)$ as shown in Table 1.

TABLE 1

| l | k | i | $Z_j^l(t)$ |
|---|---|---|---|
| 1 | 2~6 | 3~12 | Sign [Xj + Xj − 1] |
| 2 | 7~14 | 13~28 | Sign [Xj] |
| 3 | 15~18 | 29~36 | Sign [Xj − Xj − 1] |
| 4 | 16~21 | 31~42 | Sign [Xj − 2Xj − 1 + 2Xj − 2 − Xj − 3 + 0.5Xj − 4] |
| 5 | 20~30 | 39~60 | Sign [Xj − Xj − 1 + 0.5Xj − 2] |

Therefore, the main polarity series is $Z^2(t)$, the low-passed sub-polarity series is $Z^1(t)$, and the high-passed (preemphasized) sub-polarity series is $Z^3(t)$ to $Z^5(t)$. The degree Y of the pattern matching of the main and sub-polarity series $Z^2(t)$ with the reference polarity series H is expressed by the following equations (4) and (5), and the polarity pattern matching power $P_k^l(t)$ may be expressed by the following equation (6). This polarity pattern matching power $P_k^l(t)$ represents the similarity mentioned above.

$$Y^l(t) = (Y_i^l(t)) \tag{4}$$

$$Y^l(t) = (1/m) \cdot H \cdot Z^l(t) \tag{5}$$

$$P_k^l(t) = Y_{2k-1}^l(t)^2 + Y_{2k}^l(t)^2 \tag{6}$$

where
m = 32,
k = $r_1 \sim r_2$.

To sum up, the polarity bit matrix processor 6e makes a matrix operation of the main and sub-polarity series $Z^l(t)$ and the reference polarity series H to produce the similarity $P_k^l(t)$. This similarity $P_k^l(t)$ indicates how the original and filtered unit blocks t expressed by l are similar to 125 Hz and its higher harmonics expressed by k for each combination of l and k. The numerical value in the column k of Table 1 represents an example of the possible range of k for each characteristic l of the digital filter, and the numerical value in the column i of Table 1 represents the range of i=2k−1 and i=2k corresponding to the range of the column k.

Figure 5:
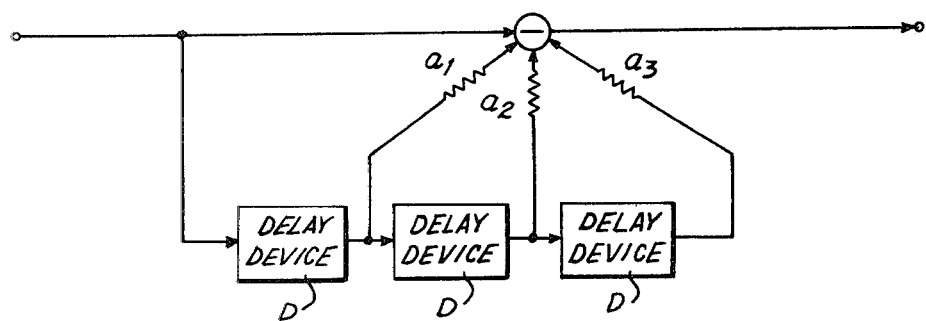
FIG. 5 is a block diagram showing an example of digital filter.

The similarity $P_k^l(t)$ calculated by the polarity bit matrix processor 6e as described above is fed to the discriminator 6f and compared with the reference value $P_{Thl}$. This reference value $P_{Thl}$ may be set by taking the filter characteristic l, frequency k and zero crossing rates zct, zcpt as parameters. The zero crossing rate zct is the zero crossing rate of the original unit block τ, and the zero crossing rate zcpt is the zero crossing rate of the unit block τ pre-emphasized by the digital filter shown in FIG. 5, wherein $a_1=1$, $a_2=-0.5$, $a_3=0$. In FIG. 5, D indicates a delay device, and $a_1$ to $a_3$ are filter coefficients. These zero crossing rates zct and zcpt are counted by the zero crossing rate counter 6c for each unit block τ and successively fed to the threshold selector 6d. The reference values $P_{Thl}$ corresponding to the zero crossing rates zct and zcpt are applied from the threshold selector 6d to the discriminator 6f. As described above, the setting of the respective values $P_{Thl}$ are made on the basis of the fact that each filter is set so that $Z^1(t)$, $Z^2(t)$, $Z^3(t)$, $Z^4(t)$ and $Z^5(t)$ may be easily made similar to low, medium low, middle, medium high and high frequency bands respectively, as indicated by k and i in Table 1. Thus, if $S_{Th} \leq St$, the nature of speech in the unit τ is determined by the discriminator 6f on the basis of the criterion as stated in the following item (a) or (b). (a) If in a unit block τ the condition that $P_k^1(t) \geq P_{TH1}$ or $P_k^2 \geq P_{Th2}$ is satisfied for at least one of K, it is determined that the unit block τ is a voice, and if not so, it is determined that the unit block τ is an unvoice. (b) if in a unit block τ either of the conditions that $P_k^3(t) \geq P_{TH3}$, $P_k^4(t) \geq P_{Th4}$ and $P_k^5(t) \geq P_{Th5}$ is satisfied for at least one of K or if neither of the conditions that $P_k^l(t) \geq P_{Th1}$, $P_k^2(t) \geq P_{Th2}$, $P_k^3(t) \geq P_{TH3}$, $P_k^4(t) \geq P_{Th4}$ and $P_k^5(t) \geq P_{Th5}$ is satisfied, it is determined that the unit block τ is an unvoice, and if not so, it is determined that the unit block τ is a voice.

The assignment controller 10 detects the occurrence of freeze-out. If freeze-out occurs, predictive coding of the unvoiced unit block is effected with a basic bit length (i.e. 4 bits), while predictive coding of the voiced unit block is successively effected with a shorter bit length (i.e. 3 bits) than the basic bit length. Thus even if freeze-out would occur, a new channel can be insured by gathering the reduced bits, thereby avoiding the freeze-out. Since the reduction of bit is made for the unit block having a good signal-to quantization noise ratio ($S/N_q$), this has almost no adverse effect on the quality of the whole speech. The relationships between DSI gain and freeze-out will be described. The relationships between DSI gain and the rate of occurrence of freeze-out at an average operating rate of 35 to 38% are that DSI gain of 3 calculated in terms of the basic bit length (4 bits) leads to about 10% shortage of channel for 240 trunks, while DSI gain given by the inverse number of an average operating rate of 35 to 38% leads to about 5% shortage of channel for 240 trunks. If the reduction to 3 bits is effected, freeze-out is supressed to less than about $5.5 \times 10^{-2}$% for an average operating rate of 38% and to less than about $3 \times 10^{-3}$% for an average operating rate of 35%. Therefore, freeze-out can be almost completely absorbed even if DSI gain of 3 is set.

Figure 6:
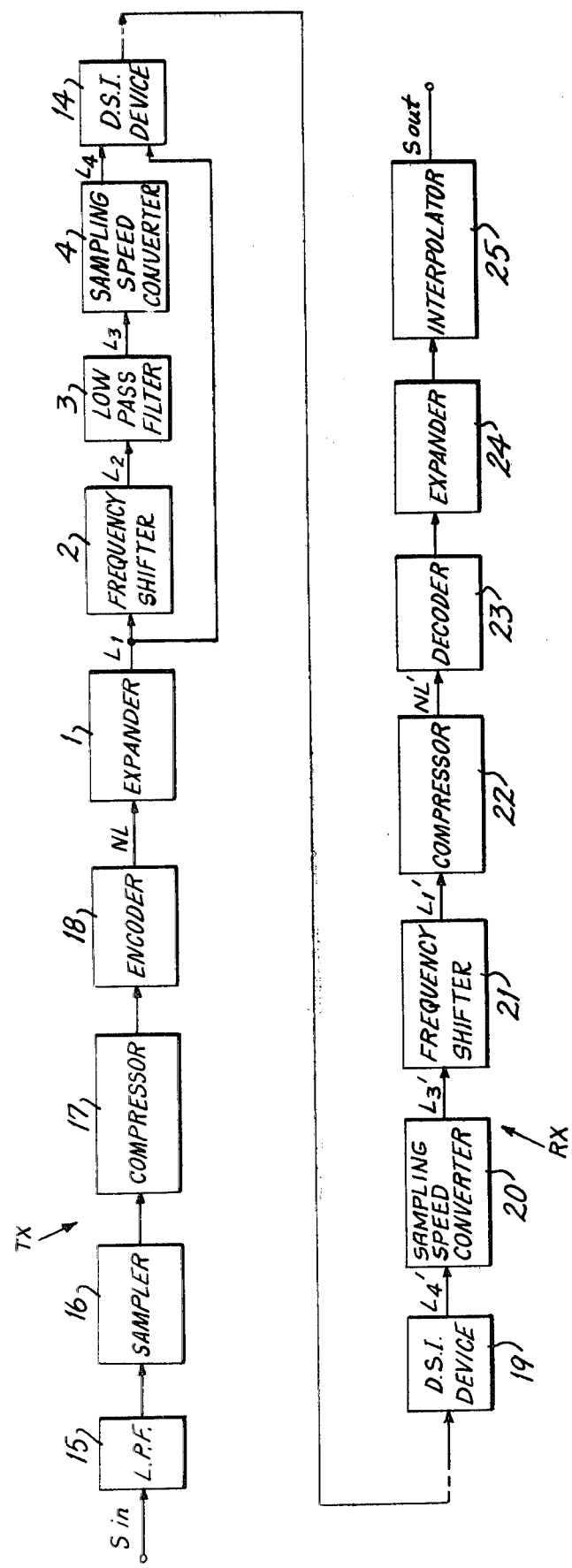
FIG. 6 is a block diagram showing a speech transmitting system constructed according to this invention.

FIG. 6 shows a digital speech transmission system constructed according to this invention. An analog signal $S_{in}$ applied to the input terminal of the transmission side TX is passed through a low-pass filter 15 of 4 KHz, sampled at 8 KHz by a sampler 16, compressed by a compressor 17 and then quantized to 8 bit by an encoder 18, thereby being transmitted to a domestic digital network as a non-linear PCM signal NL of 8 KHz·8 bit. This non-linear PCM signal NL includes a speech signal of the band of 0.3 to 3.4 KHz, as described above. In case of transmitting this non-linear PCM signal NL over a long distance, the signal is converted into a linear PCM signal $L_1$ of 13 bits by the expander 1, shifted down on its frequency band from 0.3 to 3.4 KHz to 0.1 to 3.2 KHz, passed through the filter 3 to leave only frequency components of 0.1 to 3.0 KHz and then processed by the sampling speed converter 4 to obtain a linear PCM signal $L_4$ of 13 bits with 6 KHz sampling. To this linear PCM signal $L_4$ of 6 KHz, predictive coding of 4 bit/3 bit and speech interpolation are effected for each DSI output channel by DSI device 14 including the variable quantizing bit type ADPCM encoder 7, and the linear PCM signal $L_4$ is transmitted to a digital undersea cable or the like. On the other hand, in the receiving side RX, digital signal of 6 KHz sampling in which predictive coding and speech interpolation have been effected with 4 bit/3 bit is converted into linear PCM signal $L_4'$ of 13 bit with 6 KHz sampling by DSI device 19 including a variable quantizing bit type ADPCM decoder. This linear PCM signal $L_4'$ is the same as the linear PCM signal $L_4$ from the sampling speed converter 4 at the transmission side TX, and is recompiled by sampling unit block in the same trunk from each DSI channel. Therefore, the frequency components of the linear PCM signal $L_4'$ are within 0.1 to 3.0 KHz. The linear PCM signal $L_4'$ is speed-converted from 6 KHz sampling to 8 KHz sampling by the sampling speed converter 20. After the frequency component is shifted to only 200 Hz higher frequency range by the frequency converter 21, the linear PCM signal $L_4'$ is converted into a non-linear PCM signal NL' of 8 bits by the compressor 22. Therefore, the same as the linear PCM signal $L_3$ output from the low-pass filter 3 at the transmission side Tx, the linear PCM signal $L_3'$ output from the sampling speed converter 20 is 8 KHz sampling·13 bits, the frequency component of which is 0.1 to 3.0 KHz. However, the linear PCM signal $L_1'$ is 8 KHz sampling—bits, the frequency component of which is 0.3 to 3.2 KHz, and is different from the linear PCM signal $L_1$ output from the expander 1 in the point that no higher range of frequency component of 3.2 to 3.4 KHz is included. Such difference in frequency component is similarly present between the non-linear PCM signal NL' and the non-linear PCM signal NL. After the non-linear PCM signal NL' is transmitted to domestic digital network, it is passed through the decoder 23, the expander 24 and the interpolator 25, whereby analog speech signal $S_{out}$ of 0.3 to 3.2 KHz band is produced at the output terminal. If the shift-down by the frequency converter 2 is 300 Hz and the shift-up by the frequency converter 21 is 300 Hz, analog speech signal of 0.3 to 3.3 KHz band can be obtained. However, if the amount of shift is above 300 Hz, the quality of speech is outstandingly degraded since the lower range is turned up in the shift-down of the frequency converter 2.

As described in connection with the embodiment of this invention, since the predictive encoder is of a variable quantizing bit type and the reduction of bit length in a unit block having a good signal-to-quantization noise ratio is made, this invention makes it possible to avoid freeze-out without adversely influencing the quality of speech, thereby increasing DSI gain to a theoretical limit. Also, the higher frequency range of speech is not considerably degraded even if 6 KHz sampling is used because of efficient utilization of transmission line. In this connection, the total gain to non-linear PCM signal of 8 KHz·8 bit in case of the basic bit length of 4 bits with 6 KHz sampling, becomes 8 since $3 \times (64 \text{ Kb/s}/24 \text{ kb/s}) = 8$ when DSI gain is set to 3.

I claim:

1. A digital speech interpolation system wherein digital input signals are divided into blocks which are a group of a predetermined number of serial samples and a frequency range of which is a voice band itself, and only the unit block in which speech exists is transmitted after predictive coding, comprising: a variable bit quantizer for carrying out said predictive coding, means for determining the nature of the speech in the unit block in which speech exists, means for estimating occurrence of freeze-out above a predetermined amount in speech interpolation, and means for reducing the number of quantizing bits in predictive coding in the order of the unit block which is expected to have a better signal-to-quantization noise ratio in predictive coding, and for suppressing freeze-out less than said predetermined amount in such unit.

2. A digital speech interpolation system as claimed in claim 1 wherein said predictive coding is carried out after the voice band frequency is shifted down to a lower one to the extent that a negligible noise has occurred and then the sampling speed is converted to a lower one.

* * * * *